Figure 1:
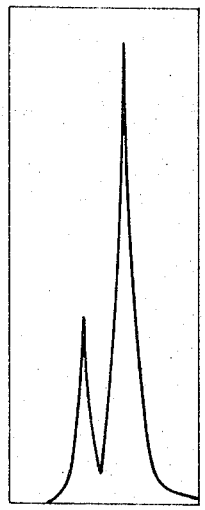

United States Patent [19]
Small

[11] 3,865,717
[45] Feb. 11, 1975

[54] SIZE SEPARATION OF POLYDISPERSE SUSPENSIONS BY HYDRODYNAMIC CHROMATOGRAPHY

[75] Inventor: Hamish Small, Midland, Mich.

[73] Assignee: The Dow Chemical Company, Midland, Mich.

[22] Filed: Dec. 8, 1972

[21] Appl. No.: 313,506

Related U.S. Application Data

[63] Continuation-in-part of Ser. No. 859,331, Sept. 19, 1969, abandoned.

[52] U.S. Cl..................... 209/1, 209/155, 210/31 C
[51] Int. Cl................................................ B03b 3/00
[58] Field of Search .............. 209/1, 142, 155, 209; 73/432 PS; 356/102, 208; 210/31, 31 C

[56] References Cited
UNITED STATES PATENTS

| | | | |
|---|---|---|---|
| 1,365,815 | 1/1921 | Charlton | 209/209 |
| 3,078,140 | 2/1963 | Hatch | 210/31 X |
| 3,326,875 | 6/1967 | Moore | 210/31 C |
| 3,458,437 | 7/1969 | Ouano | 210/31 C |

OTHER PUBLICATIONS

Simpson, D. W. & Bauman, W. C., "Concentration Effects of Recycling in Ion Exclusion," Ind. Eng. Chem., 46, pg. 1958 (1954).
Webster's Unabridged Dictionary, 2nd Ed., G & C Merriam Co., Springfield, Mass., pp. 751 & 1912.
Hackh's Chemical Dictionary, 4th Ed., McGraw-Hill, New York, p. 168 (1969).
Perry, Chemical Engineer's Handbook, 3rd Ed., McGraw-Hill, New York, p. 939 (1950).

*Primary Examiner*—Tim R. Miles
*Assistant Examiner*—Ralph J. Hill
*Attorney, Agent, or Firm*—Robert B. Ingraham

[57] ABSTRACT

Particles suspended in a fluid medium are separated by size by passing a suspension of such particles through a passage or a plurality of passages.

6 Claims, 5 Drawing Figures

PATENTED FEB 11 1975　　　　　　　　　　　　　　3,865,717

INVENTOR.
Hamish Small
BY
AGENT

SIZE SEPARATION OF POLYDISPERSE SUSPENSIONS BY HYDRODYNAMIC CHROMATOGRAPHY

This application is a continuation-in-part of my copending application Ser. No. 859,331, filed Sept. 19, 1969, now abandoned.

The determination of particle size of bodies such as finely divided solids, microorganisms and the like has presented substantial problems throughout the years. Macro particles; that is, particles that are readily distinguished by the naked eye, generally can be readily evaluated as to dimension employing a light microscope, sedimentation techniques, screening and the like. A tendency toward flocculation of macro particles frequently presents difficulty in their screening and grading. However, usually such a tendency may be overcome by the use of suitable suspending agents, antistatic agents, ionized gases and the like. In the microscopic and submicroscopic ranges the problem of flocculation and dispersion oftentimes presents essentially greater difficulties particularly where the suspended material is present in substantial concentrations; that is, concentrations in excess of about 5 weight percent. Various techniques are employed to determine such particle size distribution including the use of light microscope, ultraviolet microscope, electron microscope, various sedimentation procedures including ultracentrifuge, gas sedimentation procedures and the like. Many of these techniques are eminently satisfactory for narrow range of particle sizes or for applications wherein particles differ greatly in size. No entirely satisfactory technique is known which permits particle size determination or separation wherein particles ranging from very large to very small are present; that is, particles ranging from diameters of about 100 Angstroms to as large as 5 or 10 microns. Similarly, techniques are not readily available which permit the separation of the particles of a polydisperse suspension in the microscopic and submicroscopic range in accordance with particle size.

The present invention provides an improved process for the separation of dispersions of particles in a liquid dispersing medium by size by passing the dispersion through a porous body, the porous body having a liquid flow path of sufficient size to permit the passage of the particles of the dispersion therethrough, the method comprising adding a liquid dispersion of particles in a dispersion medium to a porous body, eluting the porous body with dispersing medium to cause the particles to pass through the porous body and subsequently collecting an effluent stream of dispersing medium from the porous body wherein larger particles of the dispersion are first removed from the porous body and successively smaller particles are subsequently removed therefrom, with the further limitation that the apparent velocity of the particles through the porous body is equal to or greater than the apparent velocity of the liquid suspending medium through the porous body; that is, $R_f$ is equal to or greater than 1 wherein $R_f$ is the ratio of the apparent velocity of the particles passing through the porous body to the calculated velocity of the suspending medium passing through the porous body assuming plug flow. This requires that particles used to make up the porous body be impermeable with respect to the particles being separated.

By way of further illustration an elongated porous body has a void volume $V_v$. Liquid suspending medium is supplied to an inlet end of such an elongated body at a rate of 0.1 $V_v$ per hour. Therefore, the calculated velocity of the liquid suspending medium through the porous body is 0.1 L per hour where L is the length of the body and a material dissolved in a suspending medium would be assumed to traverse the distance L in 10 hours if no absorption or retardation of the solute occurred. If a dispersing medium is being passed through a porous body of a length L at a rate of 0.1 $V_r$ per hour and a particulate material is introduced into the dispersing medium at a given time and appears in the effluent 8 hours later, $R_f$ has a value of 1.25.

FIGS. 1–5 depict experimental results from Examples 1–5.

A wide variety of porous bodies may be employed in the present invention. Generally, the form of the body is not critical. However, most conveniently employed is an elongated body similar to that employed for chromatographic applications. The body desirably has a surface which is generally inert to the dispersing medium employed; that is, it is insoluble in the dispersing medium, and if swollen by the dispersing medium, swells only to a sufficient degree to provide a body of the desired porosity. Such bodies are readily prepared by employing particulate materials, suspending them in a dispersing medium, adding the dispersing medium to an elongated tube in a manner similar to the packing of chromatographic columns.

A wide variety of particulate materials may be employed such as glass, plastic, metal and the like. Beneficially, such particles may be spherical or have regular geometric polygonal configurations or be irregular in shape. Eminently satisfactory for many applications are glass beads or plastic beads; particularly advantageous for many applications are small spherical plastic particles which are composed of a polymer of styrene and divinylbenzene containing from about 5 to 15 percent divinylbenzene. Such particles are rigid and insoluble in most solvents. Sand or ground siliceous material is also beneficially employed. Synthetic resinous open cell plastic foams such as polyurethane may also be employed with benefit in operations in accordance with the present invention. Rigid closed cell foams may also be employed in the practice of the present invention. Such closed cell foams are ground to a desired particle size wherein the portion of a ground foam passing a 50 mesh US Sieve Size screen is generally suitable for the preparation of porous bodies. Generally, the particles suitable for the practice of the present invention have a nominal size or diameter of from about 5 microns to about 100 microns. Generally it is the size of the voids or inter-particulate flow path within the packed beds which provides the desired degree of separation rather than the size of the particle itself. For purposes such as separating polydisperse synthetic latex particles which oftentimes range in size from about 100 Angstroms to as large as 5 microns, spherical beads having a diameter from about 5 to about 100 microns are eminently satisfactory. The precise configuration of the porous body generally is not critical. It is essential that the porous body be of generally relatively uniform porosity in order that channeling does not occur. By the term "channeling" is meant the propensity of a fluid to flow rapidly through one portion of the body and flow extremely slowly through another portion of the bed.

Usually for analytical work where information is desired rather than product, small diameter elongate columns are eminently satisfactory. Typically, such a column is from about 1 millimeter inside diameter to about 10 millimeters and has a length varying from 10 centimeters to 50 or 100 meters or more, depending upon the degree of separation desired.

It is essential and critical in the practice of the present invention that the particles being separated do not adhere to the material of the porous body and form multiparticulate layers thereon. For example, separation of particles of a synthetic latex is readily accomplished in a bed which absorbs a monoparticulate layer of latex particles by first treating the porous body with a sufficient quantity of latex to form the monoparticulate layer, passing sufficient dispersing medium through thte body to remove latex particles which are not strongly absorbed and subsequently introducing a liquid dispersion of the latex particles to the body which is now provided with a surface (of deposited latex particles) which does not exhibit any abnormal tendency to absorb the particles. Generally in the operation of such particle size separations, due to the relatively small interstitial spaces within the porous bodies it is desirable to pass the liquid dispersing medium through the bed under pressure. Typical operating pressures for columns ⅛ inch in diameter and 30 feet in length generally are from about 10 to about 5000 pounds per square inch. However, if such columns are mounted vertically and particularly rapid determinations are not required, gravity flow may be employed. However, for most applications, particularly for small scale laboratory operations or for analytical procedures, it is usually desirable to employ a porous body of small diameter and substantial length, such as ⅛ inch in diameter and 60 feet in length. Beneficially, such bodies, if formed within the flexible synthetic resinous tubing or flexible metal tubing, may be conveniently coiled to occupy a minimum of space.

The following examples illustrate the manner in which the principles of the invention are applied but are not to be construed as limiting the scope of the invention.

The apparatus employed in the examples consists of a liquid reservoir connected to a syringe pump. The discharge of the syringe pump is connected to a sample injection chamber. The sample injection chamber is a housing having inlet and outlet ports and a sample injection valve. The discharge of the sample injection chamber is connected to a separation column, the separation column consisting of two vertically disposed columns, each 4.5 feet in length and having an inside diameter of 9 millimeters. The column is connected at the upper ends by flexible tubing and at one of the lower ends to a sample injection chamber. The discharge of the column not connected to the sample injection chamber is connected to a solids detector. The solids detector is a Bryce-Phoenix light scattering apparatus employed to detect relative turbidity in the effluent of the column.

The Figures are plots of relative turbidity (ordinate) versus time (abscissa); the peaks on the left caused by the larger particles (confirmed by microscopic observation).

EXAMPLE 1

A mixture is prepared of equal parts of two monodisperse polystyrene latexes having a particle diameter of 0.5 micron and 0.109 micron, respectively. The latex is diluted to 0.2 weight percent solids with deionized water and stabilized by the addition of sodium lauryl sulfate to provide a concentration of $1.25 \times 10^{-4}$ molar. The column is packed with sulphonated cross-linked polystyrene beads having an average diameter of about 33 microns and commercially available under the trade designation of "Dowex 50W X-8". The cross-linked sulphonated polystyrene beads are employed in the form of the sodium salt. Deionized water is passed through the column and through the reservoir by the syringe pump at a rate of 24 milliliters per hour. 0.05 milliliter of the latex mixture is introduced through the sample injection valve and the turbidity of the effluent as indicated by the Bryce-Phoenix light scattering apparatus recorded on a strip chart. A distinct separation of the 0.109 micron and 0.5 micron particles is observed after a period of about 2 hours. A plot of relative turbidity versus time generally in accordance with FIG. 1 is obtained. The plot indicates the relatively sharp separation of the larger and smaller particles.

EXAMPLE 2

Figure 2:
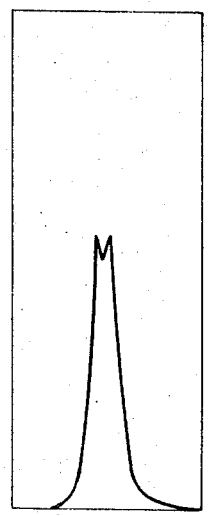
Figure 3:
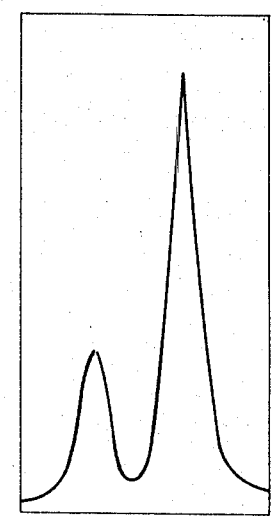

The procedure of Example 1 is repeated with the exception that a mixture of 0.109 micron and 0.234 micron monodisperse latexes are employed. The plot obtained as shown in FIG. 2 consists of a bifurcated peak, the larger size particles appearing 130 minutes after sample injection and the smaller particles 132 minutes after injection.

EXAMPLE 3

The procedure of Example 1 is repeated with the exception that the flow rate of the deionized water is 12 milliliters per hour. Excellent separation of the two latexes is obtained as set forth in FIG. 3.

EXAMPLE 4

Figure 4:
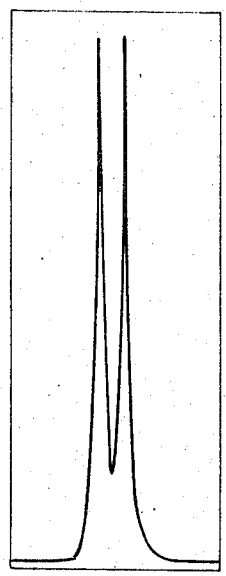

The procedure of Example 2 is repeated with the exception that the column packing beads have a diameter of from about 5 to 15 microns (Dowex 50W X-8, sodium form). Sharp separation of the two latexes is obtained as indicated in FIG. 4 which is a representation of the trace obtained from the recording of the light scattering detector.

EXAMPLE 5

Figure 5:
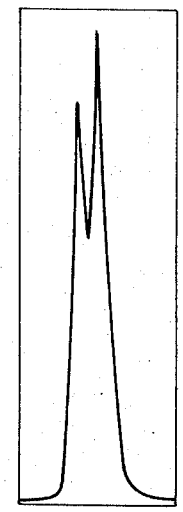

A mixture is prepared of polystyrene latex particles having diameters of 0.109 micron and 0.234 micron in equal weight proportion. The column is packed with glass beads ranging in diameter from 13 to 44 microns. The syringe pump delivers 24 milliliters per hour of an aqueous solution of a non-ionic surface active agent sold under the trade designation of "Triton X-100" in a concentration of 0.625 gram per liter to the column. Triton X-100 is isooctylphenoxypolyethyleneglycol ether having between 8 and 9 ethylene ethoxy units in the chain. Good separation of the latex particles is obtained, as is indicated in FIG. 5 which is a plot of the output of the light scattering detector.

When the foregoing procedures are repeated employing a polydisperse latex, a curve is obtained which is characteristic of the particle size distribution. Batch to batch particle size variation is readily observed by noting the variation between curves of batches of latex. Calibration of the curves is readily accomplished employing monodisperse latexes or polydisperse mixtures of monodisperse latexes by electron microscopy.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A process for the separation of first particles of a polydisperse suspension of first particles in a liquid dispersing medium by size, by passing the suspension through a porous body formed of a plurality of second particles, said second particles being impermeable with respect to said first particles, the body having generally uniform porosity, the porous body having a liquid flow path of sufficient size to permit passage of the first particles therethrough, the method comprising
    adding a suspension of first particles in a liquid dispersing medium to the porous body, the porous body being generally inert to the dispersing medium, the particles being generally non-adherent to the porous body when in the dispersing medium,
    eluting the porous body with the dispersing medium to cause the first particles to pass through voids between the second particles forming the porous body, and subsequently
    collecting an effluent stream of dispersing medium and first particles from the porous body wherein larger first particles of the dispersion are initially removed from the porous body and successively smaller first particles are subsequently removed therefrom, with the further limitation that the apparent velocity of the first particles through the porous body is equal to or greater than the apparent velocity of the fluid suspending medium through the porous body.

2. The method of claim 1 wherein the porous body comprises an elongate bed.

3. The method of claim 2 wherein the bed is composed of generally spherical second particles.

4. A method for the separation of particles of a polydisperse latex by size, the method comprising
    providing a porous body formed of particles which are impermeable with respect to said latex particles, said porous body being of generally uniform porosity having an interparticulate liquid flow path of sufficient size to permit the passage of the largest latex particles through the body, the latex particles being generally non-adherent to the body in a dispersing medium,
    passing a stream of the liquid dispersing medium through the body, the porous body being generally inert to the liquid medium,
    adding to the stream of dispersing medium an increment of dispersing medium containing a polydisperse latex,
    eluting the body with dispersing medium until the latex has passed therethrough with the further limitation that the apparent velocity of the first particles through the porous body is equal to or greater than the apparent velocity of the fluid suspending medium through the porous body, and
    detecting relative amounts of latex particles in portions of the effluent stream.

5. The method of claim 4 wherein the body is a bed of generally spherical particles, the particles of the bed being from about 5 to 100 microns in diameter.

6. The method of claim 5 wherein the bed is an elongated bed having a first end and a second end and the dispersing medium is passed from the first end to the second end.

* * * * *